(12) United States Patent
Apte et al.

(10) Patent No.: US 7,459,225 B2
(45) Date of Patent: Dec. 2, 2008

(54) MICRO-MACHINED FUEL CELLS

(75) Inventors: Raj B. Apte, Palo Alto, CA (US); David G. Duff, Woodside, CA (US); Christian G. Van de Walle, Sunnyvale, CA (US); Jeng Ping Lu, Mountain View, CA (US); Alberto Salleo, San Francisco, CA (US); Stephen D. White, Santa Clara, CA (US)

(73) Assignee: Palo Alto Research Center Incorporated

( * ) Notice: Subject to any disclaimer, the term of this patent is extended or adjusted under 35 U.S.C. 154(b) by 663 days.

(21) Appl. No.: 10/722,156

(22) Filed: Nov. 24, 2003

(65) Prior Publication Data

US 2005/0112433 A1    May 26, 2005

(51) Int. Cl.
*H01M 8/10* (2006.01)
(52) U.S. Cl. ........................................ 429/30
(58) Field of Classification Search ............ 429/30, 429/34, 35, 36, 37, 38, 39, 32
See application file for complete search history.

(56) References Cited

U.S. PATENT DOCUMENTS 6,689,502 B2 * 2/2004 Choi .......................... 429/32
2004/0115507 A1 * 6/2004 Potter et al. ................. 429/34

OTHER PUBLICATIONS

Halle, Sossina M., et al: Solid Acids As Fuel Cell Electrolytes, Apr. 19, 2001 Macmillan Magazines LTD, Nature, vol. 410, pp. 910-913, www.nature.com.

* cited by examiner

*Primary Examiner*—Patrick Ryan
*Assistant Examiner*—Monique Wills
(74) *Attorney, Agent, or Firm*—Kent Chen

(57) ABSTRACT

An improved fuel cell is described. The invention addresses the problem of mechanical failure in thin electrolytes. One embodiment varies the thickness of the electrolyte and positions at least either the anode or cathode in the recessed region to provide a short travel distance for ions traveling from the anode to the cathode or from the cathode to the anode. A second embodiment uses a uniquely shaped manifold cover to allow close positioning of the anode to the cathode. Using the described structures results in a substantial improvement in fuel cell reliability and performance.

18 Claims, 7 Drawing Sheets

MICRO-MACHINED FUEL CELLS

BACKGROUND

Fuel cells are electrochemical systems that directly produce electrical energy from two chemical compounds, typically a fuel and an oxidizer. FIG. 1 shows a typical fuel cell system in which an electrolyte 104 separates a fuel and an oxidizer. Electrolyte 104 serves as a proton exchange membrane (PEM), which is a hydrogen ion conductor but an electronic insulator. Hydrogen atoms are catalyzed from Hydrogen gas or a hydrocarbon source at the anode and disassociate from their electrons. The electrons flow through an electrode assembly not shown, through an external load 116, and back to the cathode 112. The Hydrogen ions are conducted through the PEM 104 and combine at the cathode 112 with electrons and oxygen to form water or steam, a waste product. The electrical current passing from cathode 112 to anode 120 through the external load 116 provides useful electrical energyA more detailed description of fuel cell operation is provided in a *Fuel Cell Handbook*, by Appleby, A. J. and Foulkes, F. R., and published by Van Nostrand Reinhold Co, New York, 1989.

In the illustrated system, electrolyte 104 is ideally made as thin as possible. Thin electrolytes are desirable because thinner structures are better ionic conductors and offer reduced electrical resistance. Typically, Ionic conductance is inversely proportional to thickness while electrical resistance is approximately proportional to thickness. High electrical resistance across the electrolyte increases power losses.

However, making electrolyte 104 thin increases fabrication difficulties and increases the probability of electrolyte failure. First, a thin electrolyte may not be effective at separating fuel and oxidizer. Fuel that diffuses through the electrolyte along with its electrons decreases cell efficiency because the electrons do not pass through the external circuit to provide useful energy. This situation is called fuel crossover. Fuel crossover oxidizes at the cathode 112 and generates heat. This is one limitation of using thin Nafion-based membranes with methanol fuel. Second, many fuel cell membrane technologies use soft or brittle materials. Thin electrolytes made from such materials are often mechanically unstable. If the membrane leaks or ruptures and allows bulk mixing of fuel and oxidizer, the cell fails and the device may explode or burn as catalytic materials in the anode and cathode permit runaway exothermic reactions. Fuel cell designers must balance safety and fuel crossover (which suggest thicker electrolytes) and ion conduction efficiency (which suggests thinner electrolytes). In order to solve the problem of structurally weak electrolytes, U.S. Pat. No. 4,863,813 by Dyer et al. eliminates a separating electrolyte and combines the oxidizer and the fuel in a common region 204 as shown in FIG. 2. In order to prevent a runaway fuel-oxidizer reaction, catalysts that enhance the reaction are shielded from the reacting species. To shield the catalysts, the Dyer patent teaches including the catalyst in electrode compositions and using selectively permeable electrodes. Thus, for example, the anode may be permeable to fuel but not to oxidizer. Designs of such selectively permeable electrodes are further described in Taylor et al (U.S. Pat. No. 5,102,750) and Ellgen et al (U.S. Pat. No. 5,162,166). However, the fabrication of such selectively permeable electrodes is difficult and the resulting constraints on electrode design results in non-optimal performance.

Thus an improved system of forming an electrolyte structure that maintains separation of the fuel and oxidizer yet avoids the tradeoff between mechanical robustness of the electrolyte is needed. For electrolytes in which fuel crossover is not significant, a method of mechanically stiffening a thinner electrolyte would allow better ion conduction and efficiency.

SUMMARY

A fuel cell that incorporates an improved electrolyte mechanical design is described. In one embodiment, the improved electrolyte is patterned and includes at least one recessed region to form a manifold. An electrode is positioned in a first manifold formed by the first recessed region. The positions of an anode electrode and a cathode electrode are arranged such that the distance between two electrodes, an anode and a cathode, is less than the average thickness of the electrolyte.

DETAILED DESCRIPTION

A fuel cell system that allows use of a thicker electrolyte while still enabling close placement of an anode to a cathode is described. The system maintains separation of fuel and oxidizer chambers, reduces fuel cell mechanical failure, simplifies fabrication, and maintains fuel cell performance.

Figure 1:
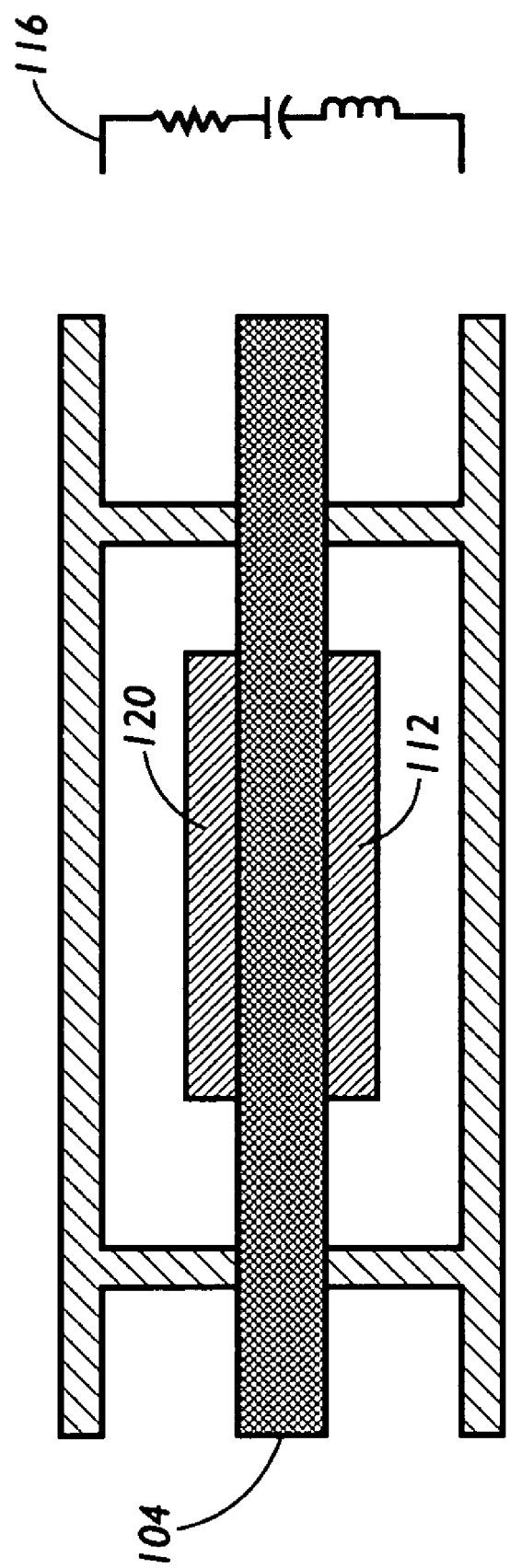
FIG. 1 shows a conventional prior art structure for a fuel cell
Figure 2:
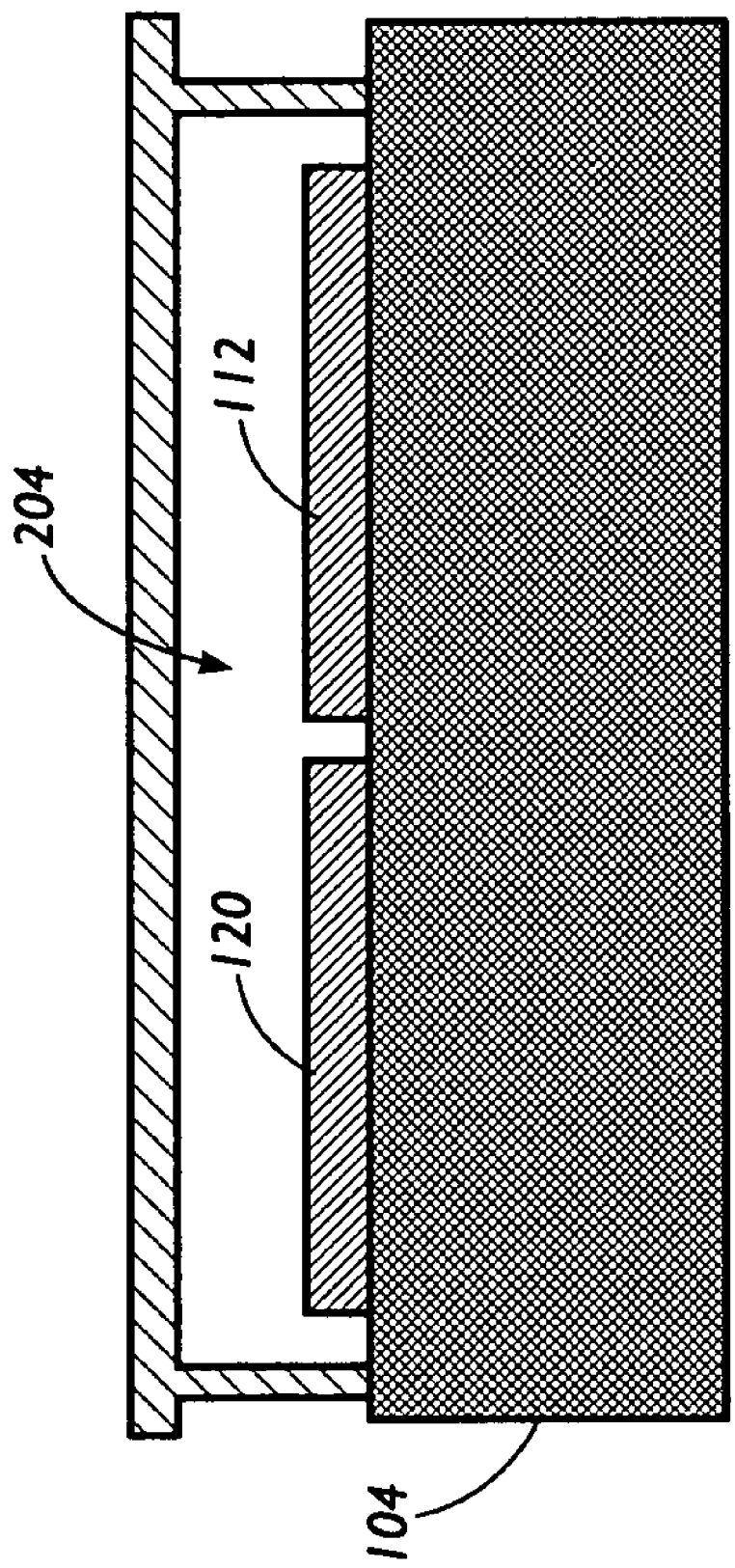
FIG. 2 shows an improved prior art structure for a fuel cell that combines the fuel and the oxidizer.
Figure 3:
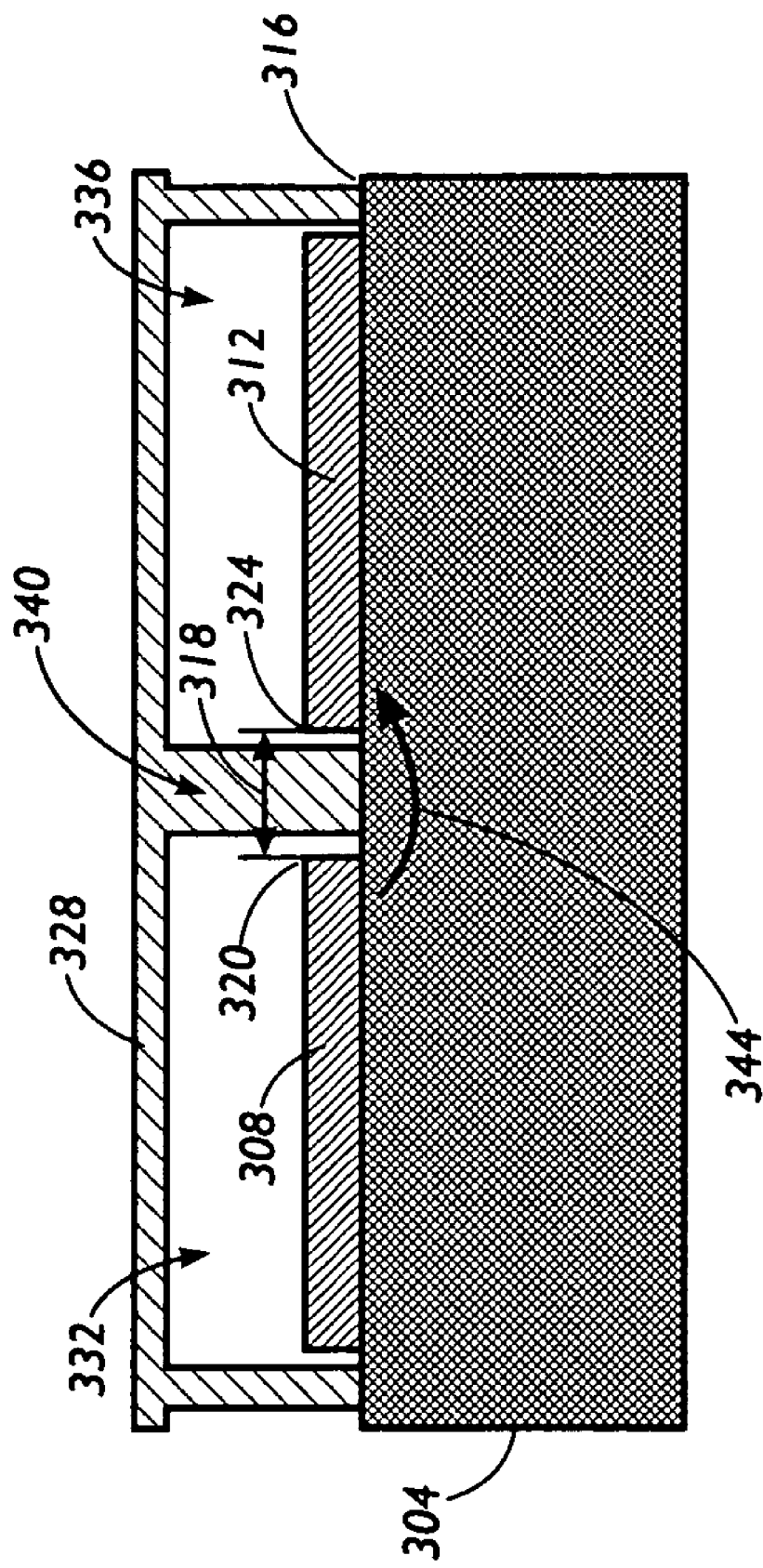
FIG. 3 shows one embodiment of a co-planar fuel cell with separate manifolds.

FIG. 3 shows a cross section of a fuel cell built on an electrolyte 304. In the embodiment shown, electrolyte 304 is a thick film that may also serve as a substrate. Alternately, electrolyte 304 may be formed on top of a support substrate (not shown). A dual manifold cover 328 over electrolyte 304 creates separate manifolds including a fuel manifold 332 and oxidizer manifold 336. Within fuel manifold 332 is an anode 308 and within oxidizer manifold 336 is a cathode 312.

In one embodiment, Electrolyte 304 is fabricated from a solid acid material. Solid acid materials are electronic insulators yet still have high ionic conductivity. These characteristics make solid acids particularly suitable for fuel cells, as described in an article by Haile et al entitled "Solid Acid Fuel Cell", *Nature* 410, 19 Apr., 2001, pp 910-913. However, solid acid materials form brittle ceramic materials, which are unsuitable for fabrication of unsupported very thin electrolyte structures.

Anode 308 and cathode 312 are formed from a conductive material, typically an inert conductor such as graphite, and positioned adjacent to electrolyte 304. Either anode 308 or cathode 312 or both anode and cathode also typically include a catalyst, such as platinum and/or ruthenium, to facilitate the reaction between fuel and oxidizer. Catalysts act as a substrate for molecular interactions and facilitate splitting of fuels and oxidizers such as hydrogen and oxygen, H2 and O2 into H and O, generally only the monatomic species are reactive.

In FIG. 3, anode 308 and cathode 312 are formed in a common plane on a first surface 316 of electrolyte 304, although planarity is not a requirement. A small separation distance 318 separates anode edge 320 from closest cathode edge 324. Separation distance 318 is preferably less than 10 micrometers? The current path 344 will be focussed in the gap regions near the cathode edge 324 and anode edge 320

A separating wall 340 in manifold 328 separates fuel chamber 332 and oxidizer chamber 336. Fuel manifold 332 typically contains a fuel such as Hydrogen or a hydrocarbon and an anode 308. An oxidizer manifold 336 typically contains a cathode 312 and an oxidizer, such as oxygen. The thickness of separating wall 340 forms a minimum limit on the distance 318 separating anode from cathode. Because close positioning of anode 308 to cathode 312 is desirable, separating wall 340 is preferably thin, often less than 10 micrometers in width. A number of techniques may be used to form a manifold with such dimensions, including photolithographic techniques.

Arrows 344 illustrate the flow of fuel ions, such as hydrogen ions. Hydrogen ions generally flow from anode 308, through electrolyte 304 to cathode 312 where they react with oxidizer. After reaction, the fuel cell outputs water. The ion flow causes a potential difference that drives electrons from the anode, through an electrical circuit, (not shown) to the cathode. The electron flow powers the external electrical circuit. Arrow 344 shows hydrogen ions flowing into one side of an electrolyte 304 and exiting the same side of the electrolyte 304 near a cathode. The novel ion path eliminates the thickness of the electrolyte as a determining factor in the path length of the hydrogen ions. Thus, cathode to anode spacing distances may be substantially less than electrolyte thickness.

Figure 4:
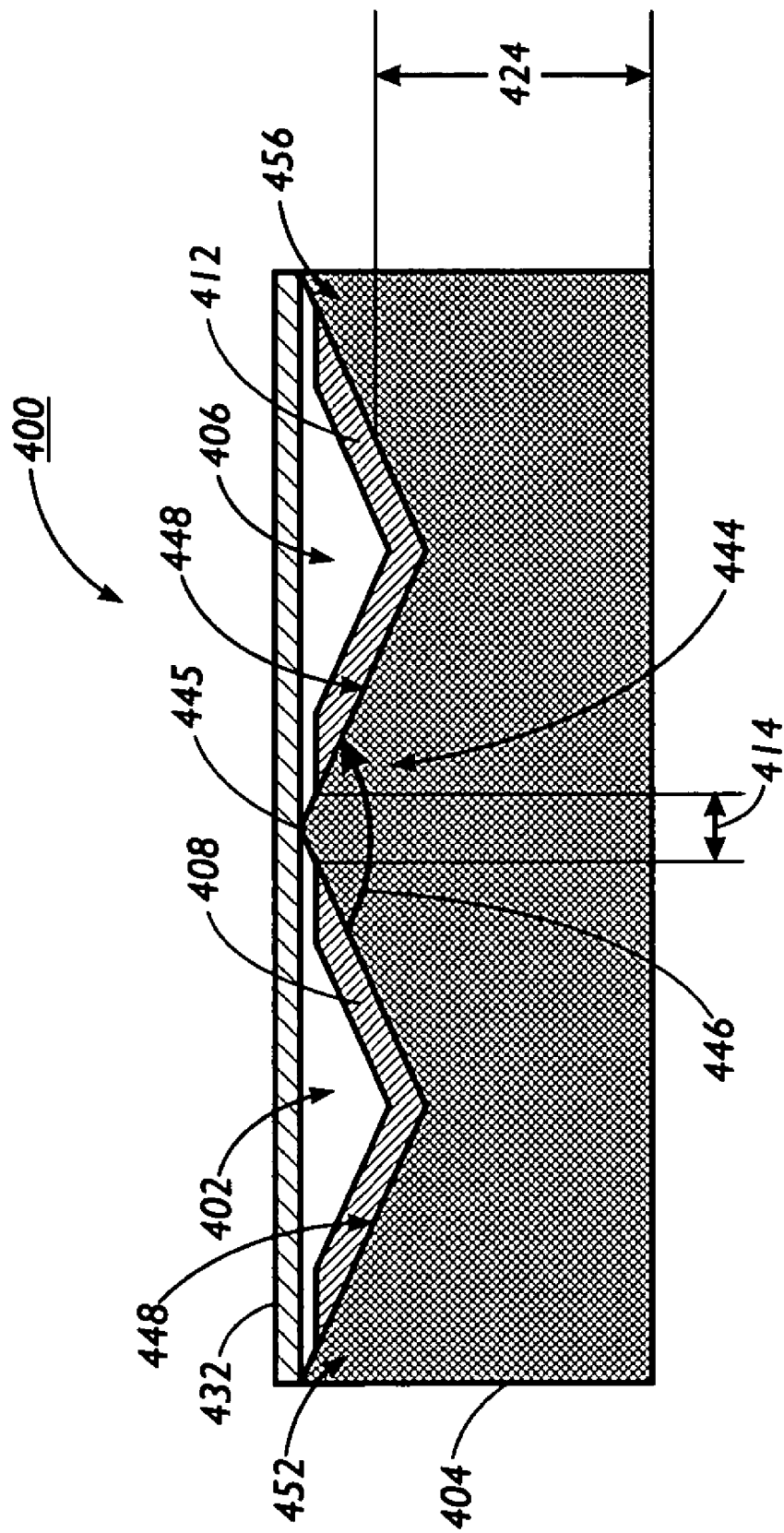
FIG. 4 shows one embodiment of a coplanar fuel cell with a corrugated electrolyte.
Figure 5:
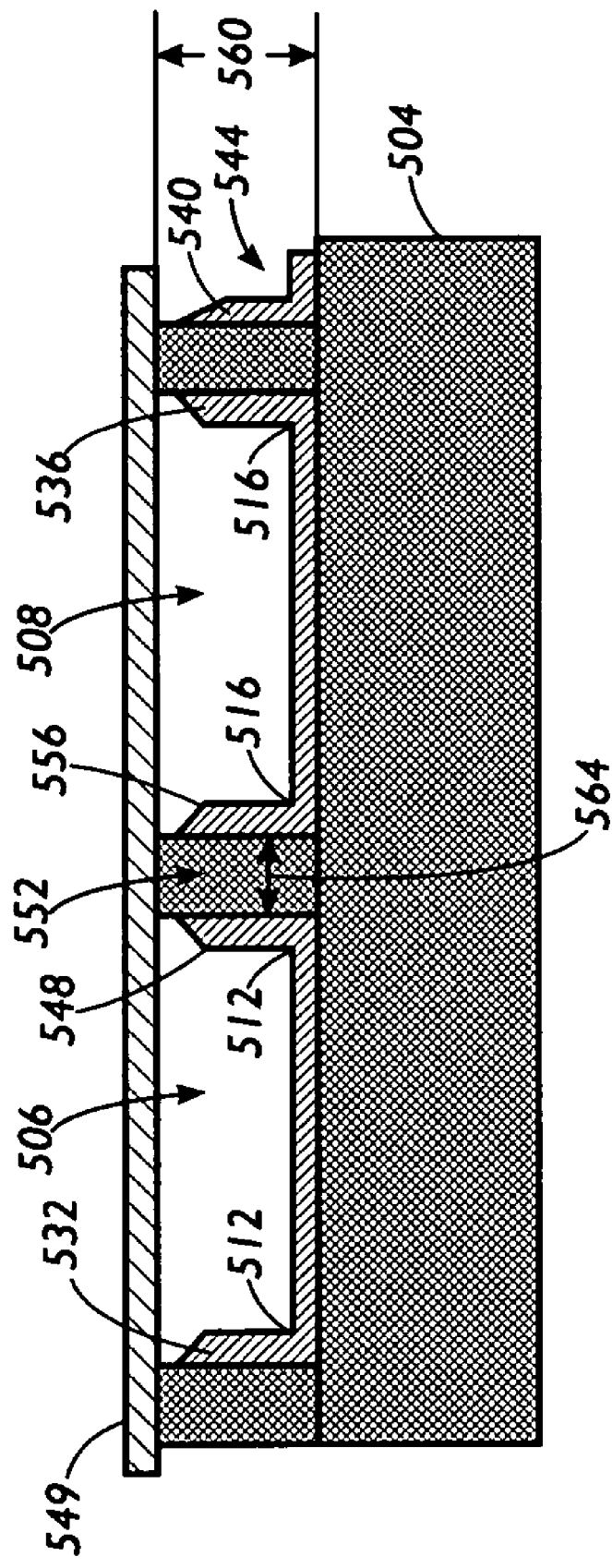
FIG. 5 shows one embodiment of a coplanar fuel cell with grooved electrolytes.
Figure 6:
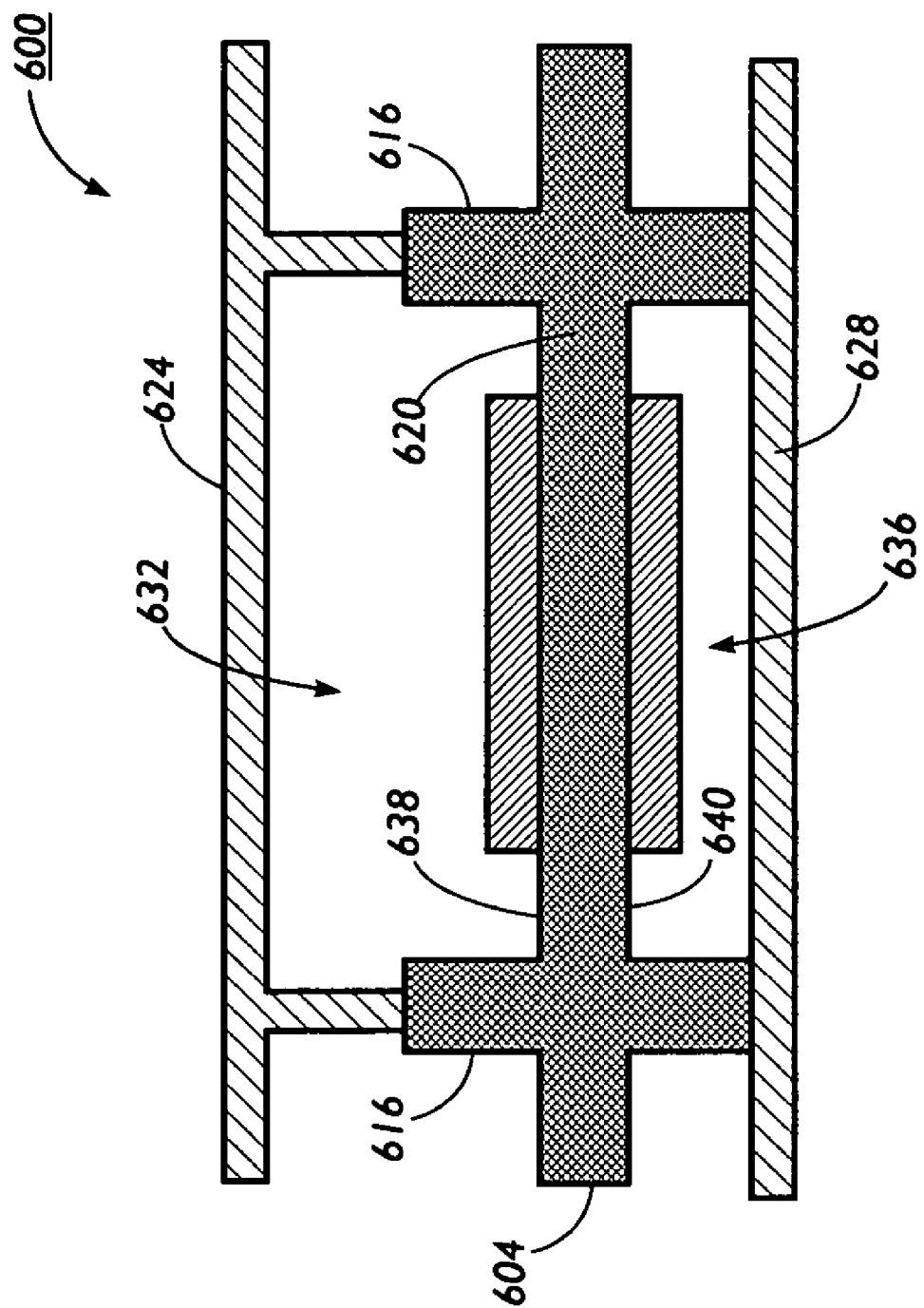
FIG. 6 shows the use of a recessed electrolyte that includes stiffening ribs.

FIGS. 4-6 show fuel cell structures in which the electrolyte, for example a solid acid, is molded, machined or otherwise shaped to create a non-planar surface that includes recessed regions. A manifold which may be planar or molded, machined or otherwise shaped, seals the recessed regions forming fuel and oxidation chambers in which electrodes and anodes are positioned.

FIG. 4 shows a fuel cell 400 embodiment that utilizes a corrugated electrolyte 404. Corrugated electrolyte 404 includes at least two recessed regions 402, 406 formed from the corrugated structure. Anode 408 and cathode 412 are positioned in corresponding recessed regions 402, 406. Each recessed region is typically triangular in cross section and typically ranges from 1 to 1000 micrometers in width at its widest point. The recessed regions 402, 406 are arranged to form fuel and oxidizer manifolds.

Shaping or corrugating the electrolyte may be accomplished by a number of techniques, including but not limited to molding or machining the electrolyte. In the case of a ceramic electrolyte, it may be patterned in the green state and subsequently fired, or it may be patterned after firing. When very small recessed regions are desired, photolithographic etching processes may be used to form the recessed regions. Typical photolithographic techniques are described in Wolf, S. and Tauber, R. N., Silicon Processing for the VLSI Era, Lattice Press, Sunset Beach, Calif., 1986 which is hereby incorporated by reference. Other methods of forming a corrugated electrolyte are available to those of ordinary skill in the art.

Raised portion 444 of corrugated electrolyte 404 forms a separating wall between fuel chamber and oxidizer chamber. The fuel and oxidizer chambers are formed from recessed regions 402, 406. Manifold cover 432 of Fuel Cell 400 couples to raised portion 444 and seals fuel chamber 436 and oxidizer chamber 440, the sealed chambers are fuel cell manifolds. When the height of raised portion 444 forms a plane with the tops of other raised portions 452, 456, manifold cover 432 may be a planar structure that seals Fuel Cell manifolds.

Arrows 444 show the migration of fuel ions from anode 408, through raised portion 444 to cathode 412. The fuel ions enter the electrolyte and exit on the same side 448 of electrolyte 404. An angled corner 445 at the top of raised portion 444 separates the entrance and exit points of fuel ions. Distance 414 between a closest point on anode 408 and a corresponding closest point on cathode 412 is substantially smaller than an average thickness 424 of electrolyte 404. Distance 414 is also smaller than the median thickness of electrolyte 404. As used herein, a median thickness is defined to be a thickness value at which half of the electrode is thicker than the median thickness, and half of the electrode is thinner than the median thickness.

FIG. 5 shows a fuel cell 500 where grooves have been formed in the electrolyte 504. The grooves form recessed regions 506, 508 which when sealed form manifolds. Each recessed manifold forms an approximate box cross section with corners 512, 516. Techniques for forming an electrolyte with the corresponding recessed regions include molding electrolyte 504, micro-machining the electrolyte, jet-printing the electrolyte or other ceramic patterning techniques known to those of skill in the art.

A dividing segment 552 of electrolyte 504 separates adjacent recessed regions 506, 508. The aspect ratio of dividing segment 556 is kept low, preferably the height 560 of dividing segment 552 is kept to less than 20 times the width 564. The low aspect ratio maintains the strength of separating segment 552.

Anode 532 and cathode 536 are formed inside corresponding recessed regions 506 and 508. Conforming anode 532 and cathode 536 to recessed regions 506, 508 contours results in an overlap of anode segment 548 with electrolyte dividing segment 552. Likewise, cathode segment 556 overlaps electrolyte dividing segment 552. Thus anode segment 548 and cathode segment 556 abut the two sides of electrolyte dividing segment 552. The thinness of dividing segment 552, typically less than 50 microns, allows positioning of anode segment 548 in close proximity to cathode segment 556 thereby facilitating ionic exchange between the two segments.

Typical fuel cells repeat the anode-cathode structure increasing the voltage and current that may be generated across the fuel cell. For example, the structure may be repeated in series such that a third anode 540 in sequential recessed region 544 is followed by a corresponding cathode (not shown). Fuel surrounds each anode and oxidizer surrounds each cathode. Ionized fuel atoms, such as cationic positively charged hydrogen ions, flow from anode, through electrolyte 504, to cathodes where they react with oxidizer. Alternatively, ionized oxidizer, such as anionic negatively charged oxygen ions, may flow from cathode, through electrolyte 504, to anodes where they react with fuel. The majority of ions travel the shortest path from anode to cathode. This shortest path is through dividing segment 552. The resulting potential difference can be used to drive electrical circuits.

In order to contain the fuel and the oxidizer, manifold cover 549 couples to electrolyte 504 creating a seal around at least two chambers suitable for containing fuel or oxidizer. The manifold cover may also provide structural support for raised portions of the electrolyte including separating segment 552. The manifold cover may be made from variety of materials such as plastic or ceramic that are compatible with fuel, electrolyte, and catalyst. Some electrolytes operate at elevated temperatures, as high as several thousand degrees Centigrade. A manifold cover that covers both anode and cathode is typically sufficiently electrically insulating to prevent electrical shorting of the anode to the cathode.

FIG. 6 shows a cross sectional view of a fuel cell 600 in which the electrolyte 604 has been patterned to include at least two recessed regions 608, 612. Electrolyte patterning may be achieved by micro-machining the electrolyte, molding the electrolyte or by other techniques known to those of skill in the art. Thicker areas 616 of electrolyte 604 act as "ribs" that provide strength to thinner areas 620 of electrolyte 604. Thinner areas are typically less than 50 microns thick and thicker areas are typically at least 100 microns thick. Although the aspect ratio of height to width of the recessed regions may vary considerably, typically the aspect ratio is kept below 0.4. The low aspect ratio helps insure the presence of sufficient thick regions of the electrolyte to maintain the strength of recessed thinner regions of electrolyte 604.

Fuel manifold cover 624 and oxidizer manifold cover 628 couple to opposite sides of electrolyte 604. The recessed regions of electrolyte 604 coupled with the manifold cover to form corresponding fuel manifold 632 and oxidizer manifold 636. The manifold covers may also serve to stiffen and strengthen electrolyte 604. An anode adjacent to electrolyte 604 in fuel chamber 632 and a cathode adjacent to an opposite side of electrolyte 604 in oxidizer chamber 636 provides electrical contact points. Fuel ions enter a first side 638 of electrolyte 604 and exit the electrolyte 604 on a second side 640. After exiting electrolyte 604, the fuel ions interact with a catalyst and oxidizer in oxidizer chamber 636. Alternatively, oxidizer ions enter a first side 640 of electrolyte 604 and exit a second side 638.

Figure 7:
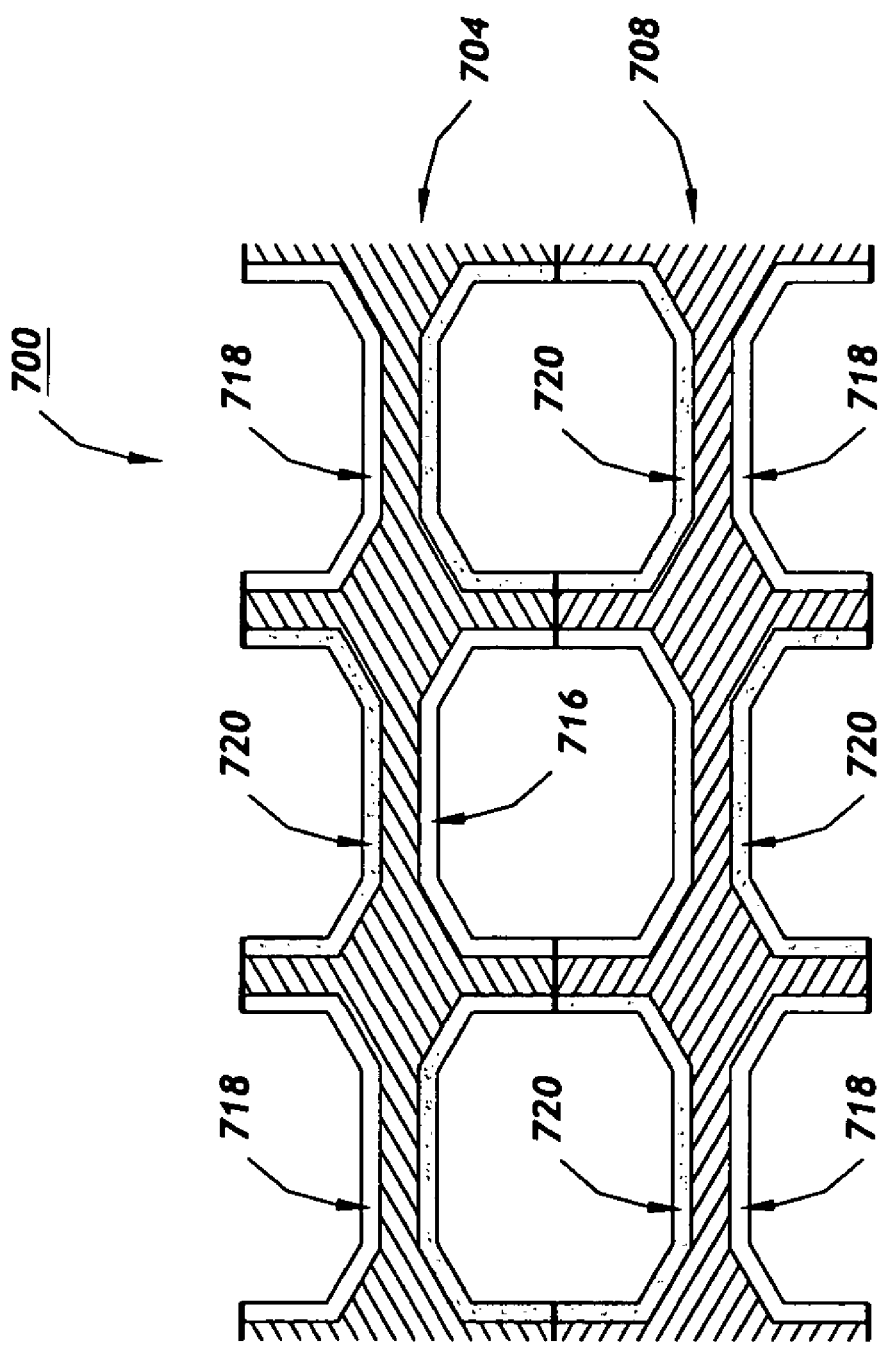
FIG. 7 shows one embodiment of the recessed fuel cells in which fuel cells are stacked.

Fuel cells are sometimes stacked to more efficiently utilize a volume of space. (See Appleby, *Fuel Cell Handbook*, op cit.) FIG. 7 is a cross sectional side view of a fuel cell 700 that shows one method of stacking a plurality of fuel cells 704, 708, similar or equivalent to the fuel cell structures of FIG. 5 and FIG. 6. Cells containing anodes 716, 718 are positioned adjacent to cells containing cathodes 720. In the particular embodiment shown, four adjacent cathodes 720 surround anode 716, however other arrangements may be used to fit different electrical or mechanical needs. The anodes and cathodes may be made from materials known in the art, typically including a conductor and a catalyst.

Stacking and electrically coupling together the cell outputs enables an increase in the voltage or current output by the stack. Parallel electrical connections increase the current while serial electrical connections increase the voltage output by the stack.

Electrical connections between adjacent cells may be made a number of ways. In one embodiment, no electrical connections are made in the manifold itself. Instead, the electrical connections are made at the endplates (not shown). The endplates form the terminations of the fuel cell structure in the front and back, parallel to the cross section of FIG. 7. Alternate methods of electrically interconnecting cells may also be used.

In the example fuel cell 700, manifold covers between cells have been eliminated. Instead adjacent cell walls serve to seal each cell. Manifold covers may still be utilized on the top and bottom or on the sides of the cell stack. Although individual cells may be fragile, stacking increases the mechanical strength of the overall structure.

In the preceding description, a number of details have been provided. Such details include ideal dimensions, electrolyte shapes, examples of typical electrolyte material, and typical fuels for use in a fuel cell. Such details are provided to facilitate understanding of the invention and provide examples. However, such details should not be interpreted to limit the scope of the claim. The limits of the invention should only be defined by the claims which follow.

What is claimed is:

1. A fuel cell comprising:
an electrolyte having a first side;
a manifold cover that is coupled to the electrolyte to form two manifolds, a first manifold including an anode, a second manifold including a cathode, the two manifolds both on the first side of the electrolyte, the anode and the cathode also on the first side of the electrolyte and configured to cause ions to conduct such that the predominant ion flow is between the anode on the first side of the electrolyte and the cathode on the first side of the electrolyte.

2. The fuel cell of claim 1 further comprising:
fuel in the first manifold; and,
oxidizer in the second manifold.

3. The fuel cell of claim 1 wherein the anode and the cathode are in a first plane, the first plane approximately parallel to the first side of the electrolyte.

4. The fuel cell of claim 3 wherein the manifold is a separating manifold that includes a perpendicular section that separates the cathode and the anode such that an edge of the cathode closest to the perpendicular section and an edge of the anode closest to the perpendicular section are separated by less than 1000 micrometers.

5. The fuel cell of claim 4 wherein an edge of the cathode furthest from the perpendicular section and an edge of the anode furthest from the perpendicular section is approximately the sum of (1) the distance separating the closest points on the anode the cathode and (2) the width of the cathode and (3) the width of the anode.

6. The fuel cell of claim 1 wherein the first side of the electrolyte is a plane, the anode and the cathode both mounted on the first side of the electrolyte.

7. The fuel cell of claim 1 wherein the thickness of the electrolyte exceeds 10 micrometers and a distance separating at least one point on the anode and at least point on the cathode is less than 50 micrometers.

8. The fuel cell of claim 1 wherein the first side of the electrolyte includes a first indentation and a second indentation, the first indentation including the anode, the second indentation including the cathode.

9. A fuel cell comprising:
an electrolyte having a first side;
a manifold cover that is coupled to the electrolyte to form two manifolds including a first manifold and a second manifold, the first manifold including an anode, the second manifold including a cathode, the two manifolds both on the first side of the electrolyte, the first manifold formed from a first indentation in the first side of the electrolyte and the second manifold formed from a second indentation in the first side of the electrolyte, the anode and cathode formed such that a bend in the anode is approximately equal to or greater than 90 degrees but is less than 180 degrees and a corresponding bend in the cathode is approximately equal to or greater than 90 degrees but is less than 180 degrees.

10. The fuel cell of claim 8 wherein the manifold is a planar manifold cover, the manifold in contact with an edge of the first indentation and an edge of the second indentation such that the first indentation forms the first chamber and the second indentation forms the second chamber.

11. The fuel cell of claim 10 wherein the thickness of the electrolyte exceeds 10 micrometers and a distance separating at least one point on the anode and at least point on the cathode is less than 50 micrometers.

12. The fuel cell of claim 8 wherein the cathode including at least one cathode bend, the cathode bend having an angle of approximately 90 degrees, the anode also including at least one corresponding anode bend, the anode bend having an angle of approximately 90 degrees.

13. The fuel cell of claim 1 wherein the electrolyte is a continuous planar electrolyte.

14. The fuel cell of claim 13 wherein the electrolyte is sufficiently thick to serve as a substrate for the fuel cell.

15. The fuel cell of claim 14 wherein multiple fuel cells are formed on the continuous planar electrolyte.

16. The fuel cell of claim 1 further comprising:
oxidizer in the first manifold; and,
fuel in the second manifold.

17. The fuel cell of claim 1 wherein the predominant ion flow represents over 50% of the ion flow from the anode to the cathode.

18. The fuel cell of claim 1 wherein the anode includes a wider side and a narrower side and the cathode also includes a wider side and a narrower side, the predominant ion flow propagating from a wider surface of the anode into the first side of the electrolyte and from the first side of the electrolyte into a wider surface of the cathode.

* * * * *